Figure 7:
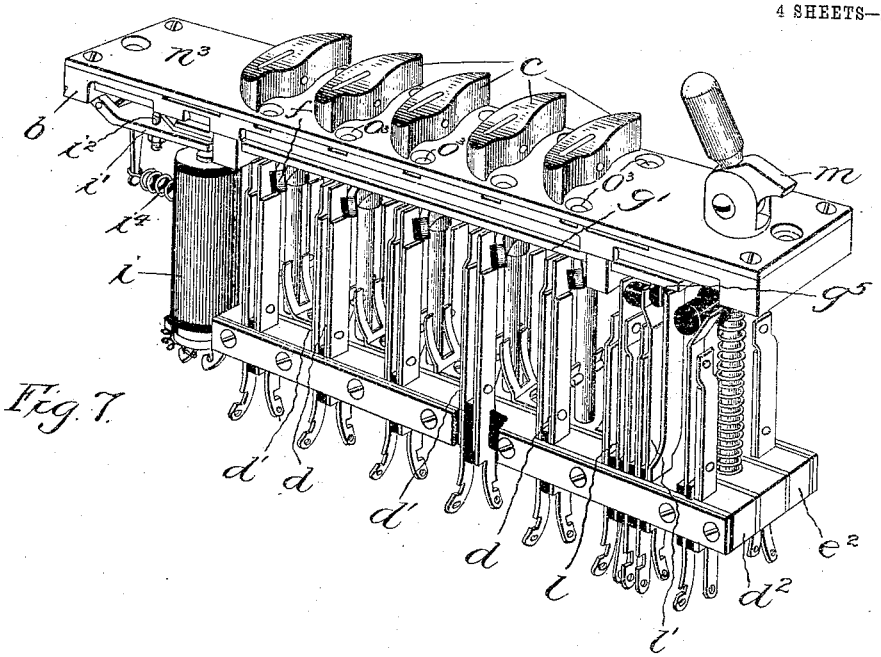

No. 828,089. PATENTED AUG. 7, 1906.
E. B. CRAFT.
SWITCH KEY.
APPLICATION FILED JULY 5, 1904.
4 SHEETS—SHEET 1.
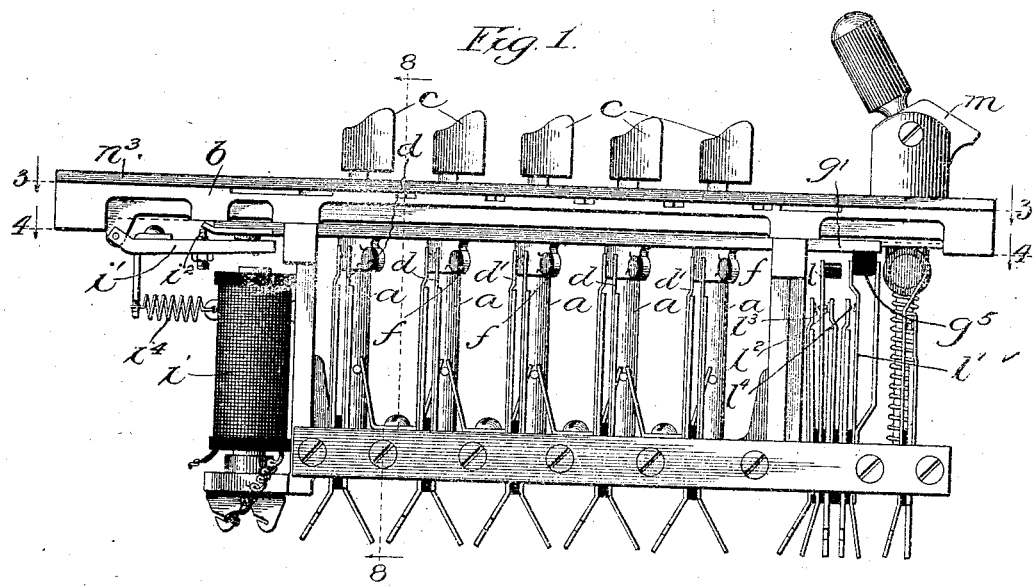
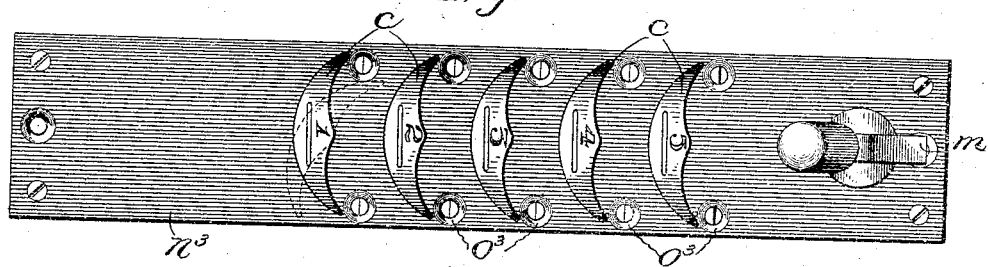
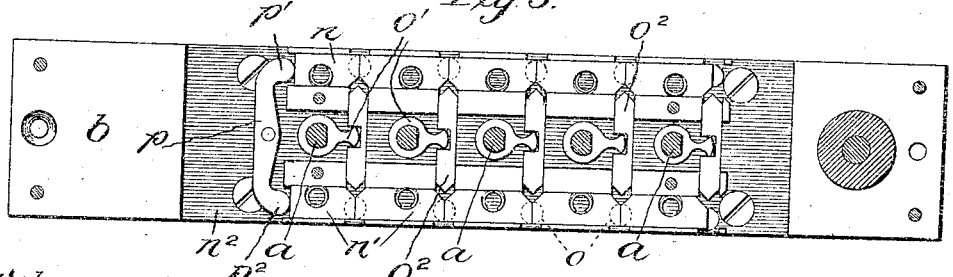
Witnesses:
Geo. C. Darrow.
H. H. Leach
Inventor:
Edward B. Craft,
By Barton Barner
Attys.

No. 828,089. PATENTED AUG. 7, 1906.
E. B. CRAFT.
SWITCH KEY.
APPLICATION FILED JULY 5, 1904.
4 SHEETS—SHEET 2.
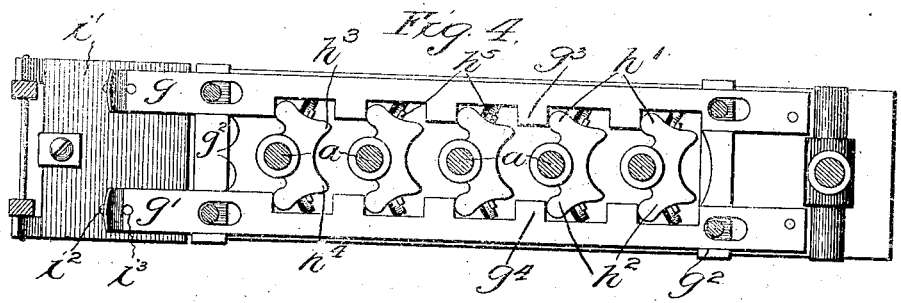
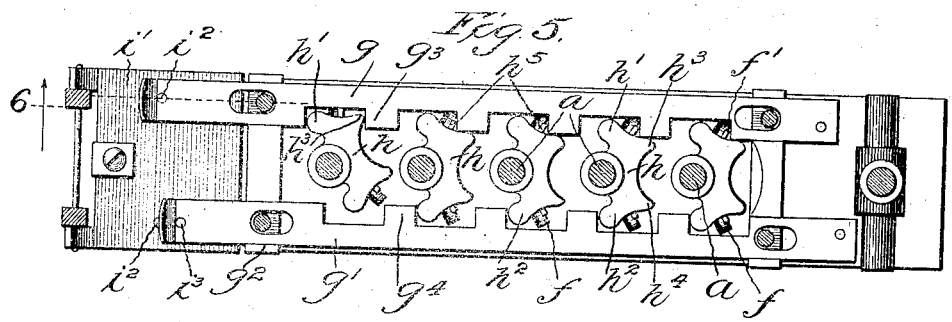
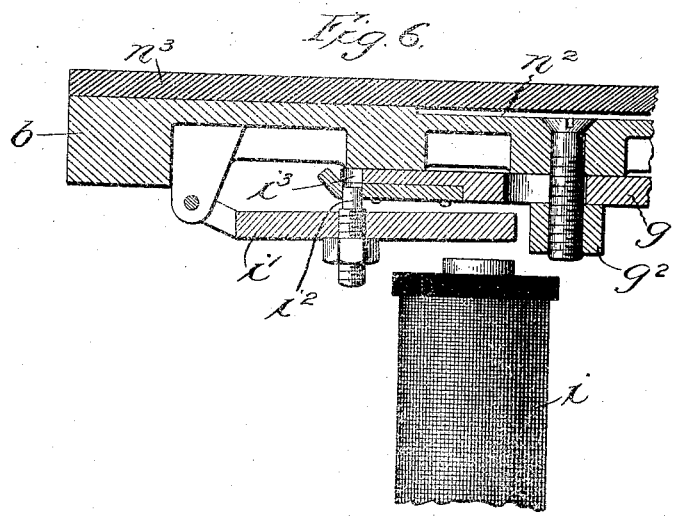
Witnesses:
Inventor:
Edward B. Craft,
By Barton & Tanner
Att'ys.

No. 828,089. PATENTED AUG. 7, 1906.
E. B. CRAFT.
SWITCH KEY.
APPLICATION FILED JULY 5, 1904.

4 SHEETS—SHEET 3.

Witnesses:
Geo. E. Davison,
W. W. Leach

Inventor:
Edward B. Craft,
By Barton & Tanner
Att'ys

No. 828,089. PATENTED AUG. 7, 1906.
E. B. CRAFT.
SWITCH KEY.
APPLICATION FILED JULY 5, 1904.

4 SHEETS—SHEET 4.

Witnesses:

Inventor:
Edward B. Craft,
By Barton & Banner
Attys.

UNITED STATES PATENT OFFICE.

EDWARD B. CRAFT, OF CHICAGO, ILLINOIS, ASSIGNOR TO WESTERN ELECTRIC COMPANY, OF CHICAGO, ILLINOIS, A CORPORATION OF ILLINOIS.

SWITCH-KEY.

No. 828,089.

Specification of Letters Patent.

Patented Aug. 7, 1906.

Application filed July 5, 1904. Serial No. 215,209.

*To all whom it may concern:*

Be it known that I, EDWARD B. CRAFT, a citizen of the United States, residing at Chicago, in the county of Cook and State of Illinois, have invented a certain new and useful Improvement in Switch-Keys, of which the following is a full, clear, concise, and exact description.

My invention relates to a switch-key for telephone-exchanges, and has for its object to provide an improved device which will be especially adapted for use as a party-line ringing-key and which will be convenient, reliable, and certain in its operation, compact and durable in construction, and so arranged that actuation of the device at improper times will be prevented.

My invention contemplates a switching device which will be adapted to be mounted upon the horizontal key-shelf of a telephone-switchboard in association with the operator's cord-circuit and employed for either code or selective signaling to apply current of distinctive character to the line to operate the bells of substations thereof. The key may comprise a number of actuating-shafts mounted vertically to rock in bearings in a suitable framework, each shaft being adapted when operated to actuate individual switch-springs, and so to apply a particular current to a party-line. Whenever any one of the shafts is rocked to operate its associated switch-springs, a blocking device is actuated which serves to prevent subsequent manipulation of the remaining shafts until the actuated shaft is returned to its normal position, said blocking device also serving to lock the actuated shaft in its abnormal position. An electromagnet is arranged to hold the blocking device in its actuated position until the proper signal has been applied to the line, when it will be automatically operated to release the blocking device and restore the apparatus to normal condition. In the preferred form of my invention I employ a series of such vertical shafts, each shaft having two sets of switch-springs associated therewith, one set on either side thereof. Each shaft has a double-crank lever above the supporting-frame whereby the shaft may be rocked in either direction to operate its associated springs. The key may comprise five actuating-shafts and their associated switch-springs and may be conveniently employed to signal subscribers of a ten-party line. Two latch-bars are provided, one on either side of the row of shafts, adapted to be actuated by each shaft, according to the direction in which the shaft is rocked. Either bar when actuated is adapted to lock the actuated shaft in its operated position and to engage the remaining shafts in such a manner as to prevent subsequent manipulation thereof until the actuated shaft is returned to its normal position. The latch-bar when so moved is arranged to be held by the armature of an electromagnet. The electromagnet may be arranged to be energized as soon as the proper distinctive signal has been applied to the line, whereupon its armature will release the latch-bar and the apparatus will be automatically restored to its normal position. With the unactuated shafts locked during the operation of a given shaft confusion in the application of signals to a party-line is avoided, since the operator cannot while a distinctive signal is being applied to a party-line to signal one of the subscribers thereof impose a current of different characteristics upon the circuit to signal another substation of the line.

I will describe my invention by reference to the accompanying drawings, wherein—

Figure 8:
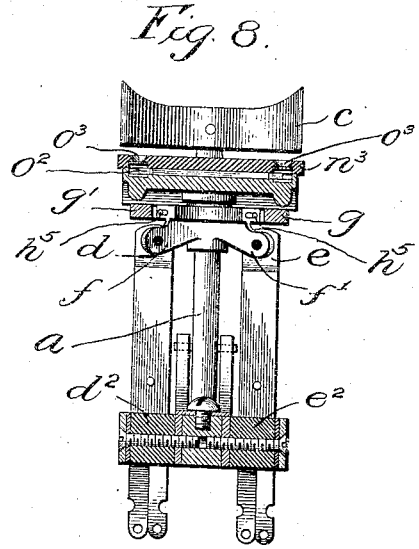
Figure 9:
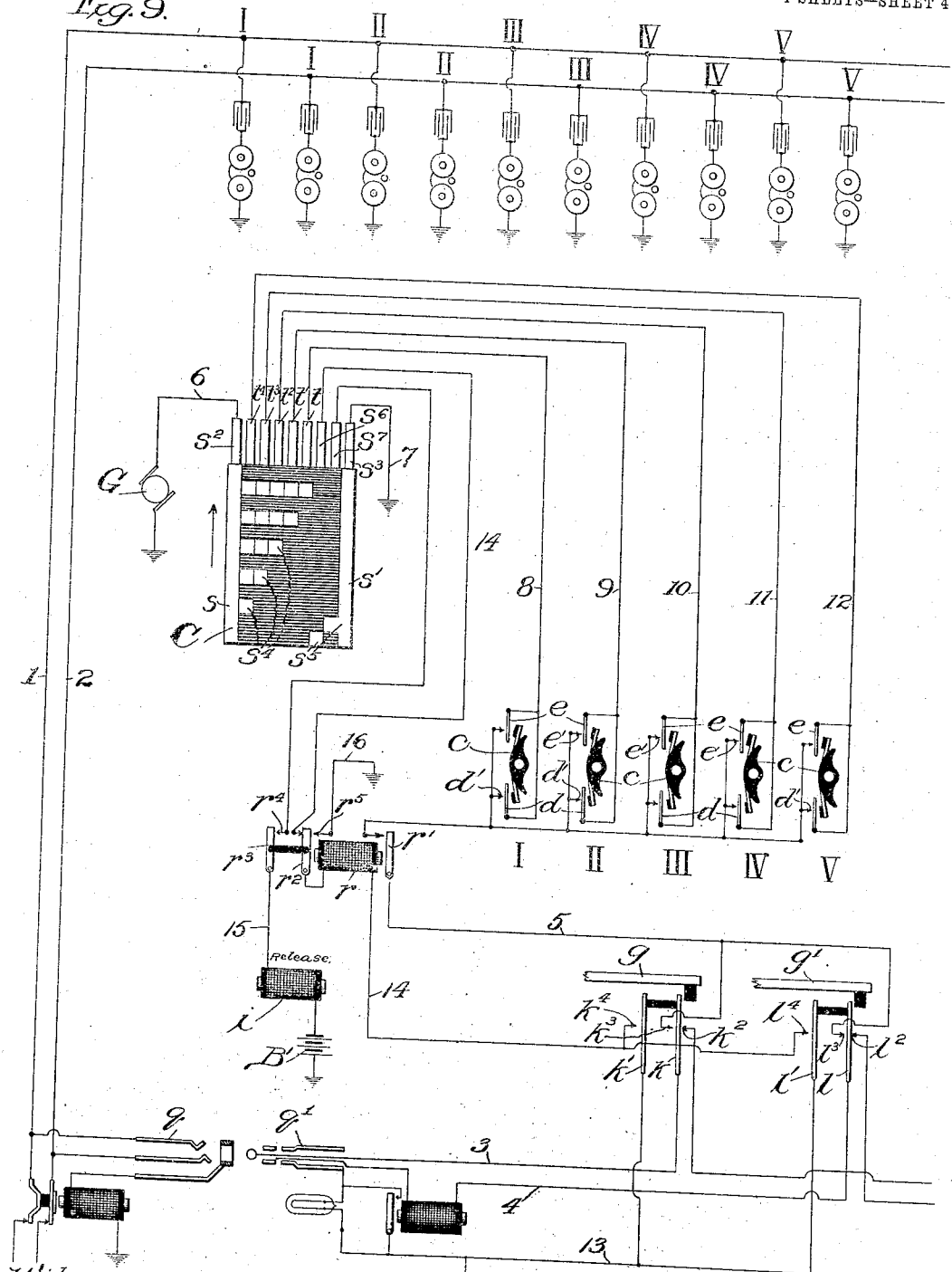

Figure 1 is a view in side elevation of a party-line ringing-key embodying my invention. Fig. 2 is a plan view thereof. Fig. 3 is a sectional plan view on line 3 3 of Fig. 1. Fig. 4 is a sectional plan view on line 4 4 of Fig. 1. Fig. 5 is a similar view with the parts in an alternative position. Fig. 6 is an enlarged detail sectional view on line 6 6 of Fig. 5 of the electromagnetic mechanism controlling the latch-bars. Fig. 7 is a perspective view of the key. Fig. 8 is a cross-sectional view on line 8 8 of Fig. 1; and Fig. 9 is a circuit-diagram, illustrating how the key shown in Figs. 1 to 8 may be connected for use with an operator's cord-circuit to signal any one of the stations of a party-line.

The same characters of reference are used to designate the same parts wherever they are shown.

The key illustrated comprises five actuating-shafts *a a*, mounted vertically to rock in bearings in the supporting-frame *b*, each shaft carrying at the top above the face of the supporting-frame a crank-lever *c*, which is adapted to be pulled by the finger of the operator to rock the corresponding shaft in either direction. The shafts are mounted at intervals in a line along the framework, and each shaft is provided with two sets of individual switch-springs $d\ d'$ and $e\ e'$, which are preferably mounted parallel to the shaft and on either side thereof, said springs being held in slots in insulating supporting-strips $d^2\ e^2$, extending longitudinally along the bottom of the frame and forming a part thereof. Each shaft carries horizontally-projecting arms $f f'$, forming a double rocking lever adapted to operate the springs $d\ d'$ and $e\ e'$, respectively, associated with such shaft, according to the direction in which the shaft is rocked. Thus when the shaft is rocked in a clockwise direction the arm $f$ serves to move the spring $d$ into engagement with its anvil $d'$, and when the shaft is rocked in a contra-clockwise direction the arm $f'$ is adapted to close together contact-springs $e\ e'$. This construction is especially adapted for advantageous use with ten-party lines to signal the substations thereof and furnishes a very compact and efficient device which is exceedingly convenient for such use.

The switch-key above described is equipped with a blocking device adapted to be actuated in the movement of any one of the shafts $a$ to prevent subsequent operation of the remaining shafts until the actuated shaft is returned to its normal position, the blocking device also serving to lock the actuating-shaft in such a position for a predetermined period, when the shaft is returned to its normal position and the blocking device counteracted to restore the remaining shafts to operative condition. The mechanism which I prefer to use for accomplishing this work consists of two latch-bars $g\ g'$, mounted to slide in bearings $g^2\ g^2$ in the side of the framework, one bar lying on each side of the row of actuating-shafts $a\ a$. (See Figs. 4 and 5.) The bars $g\ g'$ are provided with series of teeth $g^3\ g^4$, respectively, and a cam $h$ is carried by each shaft, having ears $h'\ h^2$, respectively, adapted to engage the teeth $g^3\ g^4$ of the said latch-bars, according to the direction in which the shaft $a$ is rocked, and so to move one or the other of the bars $g\ g'$ longitudinally. Either of the bars when thus advanced is adapted to engage the cams of the shafts in their normal positions and act as a blocking device to prevent the operation thereof until the actuated shaft is returned to its normal position, the cam of the actuated shaft being held by said bar in its abnormal position. This I preferably accomplish by providing shoulders $h^3 h^4$ on each cam adjacent to the bars $g\ g'$, respectively, said shoulders when the cam is in its normal position lying to one side of the teeth $g^3\ g^4$, respectively. Pins $h^5\ h^5$ are carried by each cam, one between each ear and shoulder thereof, and the teeth of a bar when the same is advanced are adapted to engage a shoulder and pin of each cam in its normal position to lock the same against movement.

When a shaft $a$ is rocked in a contra-clockwise direction, as illustrated in Fig. 5, the ear $h'$ of the cam $h$ of said shaft engages a tooth $g^3$ of the bar $g$ and advances said bar longitudinally. The ear $h'$ and shoulder $h^3$ now lie between the two teeth $g^3$ of the bar $g$, and the cam will thus be held in its actuated position until the bar returns to its normal position. The remaining shafts being in their normal positions, the teeth $g^3$ adjacent to the shoulders $h^3$ of the cams $h$, associated with such shafts, are moved along the surface of the shoulders and into engagement with the pins $h^5$, so that the movement of the remaining cams in either direction is prevented until the bar returns to its normal position. A magnet $i$, carried by the supporting-frame, is provided with an armature $i'$ for locking either bar in the position to which it has been advanced by the movement of any one of said cams, said armature being preferably pivoted to the upper portion of the framework of the device. The armature may carry studs $i^2\ i^2$, which normally rest opposite and adjacent to the ends of the bars $g\ g'$, and each of said bars may have a recess $i^3$ near its end adjacent to the studs $i^2\ i^2$ of the armature $i'$, so that when either of the bars $g\ g'$ is moved by the rocking of any one of the shafts $a\ a$ one of the studs $i^2$ will enter the recess $i^3$ of such bar and lock the same in its forward position, dependent upon the actuation of the magnet $i$, a spring $i^4$, associated with the armature $i'$, serving to move the armature and force the stud into said recess when the same registers therewith. Thus in brief when any one of the shafts is rocked in either direction the cam $h$ associated therewith engages one or the other of said latch-bars $g\ g'$ and advances the same longitudinally until such bar is locked by the armature $i'$ of the magnet $i$. The cam of the actuating-shaft is now held between two of the teeth of said bar and locked in its operative position, and the remaining teeth of the bar are in engagement with the cams of the remaining shafts, locking said shafts in their normal positions to prevent the actuation thereof until said bar has been released by the electromagnet $i$ and the actuated shaft returned to its normal position.

Each of the bars $g\ g'$ is adapted when actuated by the rocking of any one of the shafts $a\ a$ to actuate sets of contact-springs, which may serve to interrupt the operator's cord-circuit. Each bar may carry a piece $g^5$ of insulating material arranged to actuate sets of switch-springs which may be mounted in slots in the supporting-strip in a manner similar to the mounting of the individual sets of switch-springs $d\ d'$, and $e\ e'$. A pair of springs $k\ k'$ (see Fig. 9) is adapted to be moved by the bar $g$, the spring $k$ when so moved breaking contact with its anvil $k^2$ and closing upon its front contact $k^3$, while spring $k$ is moved into engagement with its anvil $k^4$. Similarly, the bar $g'$ is adapted when advanced to move a corresponding pair of springs $l\ l'$. Spring $l$ when so moved is separated from its inner contact $l^2$ and moved into engagement with its front contact $l^3$, while spring $l'$ closes upon its front contact $l^4$.

A listening-key $m$ of well-known construction may be provided in association with the ringing-key and may be supported by the framework of the device, as shown.

Where party-line ringing-keys are employed, it often becomes necessary to resignal a subscriber, and it is desirable to associate a target with each of the actuating-shafts of the key adapted to be displayed whenever the shaft associated therewith is operated. The target thus serves to identify the shaft which was last operated and should remain displayed until another shaft is operated, when such target will be withdrawn and the target associated with the newly-actuated shaft substituted therefor. If, therefore, the operator should have occasion to transmit a second signal, as in the case where the called subscriber does not respond to the first signal, she can tell by glancing at the ringing-key which of the shafts was last actuated—that is, which station was last signaled—without necessitating any effort of memory on her part. To accomplish this work in the key of my invention, I provide a series of shields $n$ $n'$, Fig. 3, slidably mounted in a bed-plate $n^2$, immediately below the top plate $n^3$, one series of shields being located on each side of the row of actuating-shafts $a$. The opposing ends of each two shields are preferably beveled and conceal a small target $o$, which may be of paper of some distinctive color. I prefer to employ red targets on one side of the row of shafts $a$ and white on the other, each shaft having associated therewith one target of each series. Each shaft $a$ carries an arm $o'$, which is adapted to operate a double wedge $o^2$. The wedge is adapted when moved to engage the opposing ends of two shields of either series, according to the direction in which the shaft is rocked, and separate the same, so that one of the pair of targets associated with the shaft and normally concealed by the opposing ends of said shields may be seen through an opening $o^3$ in the top plate of the framework. A centrally-pivoted rocking lever $p$ is located at the end of the series of shields, with its two ends $p'\ p^2$ abutting against the ends of the two series adapted to assist in the withdrawal or concealment of a displayed target when another shaft is operated.

The operation of the signaling apparatus above described may be briefly outlined as follows: Assume the shaft $a$ to be rocked in a contra-clockwise direction. The wedge $o^2$ will then be moved to separate two of the shields in the series $n$ to display the target $o$ belonging to such shaft, which is normally concealed by the said shields. Now if the next shaft to be operated is rocked in the same direction the wedge associated therewith in separating two other shields of the series $n$ to display the target of the newly-actuated shaft will move the row of shields $n$ longitudinally in such a way as to unite the two shields previously separated, and so conceal the first-displayed target; but if the shaft subsequently actuated be rocked in a clockwise direction and separate two of the segments $n'$ the lever $p$ will be rocked in a clockwise direction, so that its end $p'$ will move the shields of the series $n$ longitudinally to close together the two shields first separated. It will thus be seen that a target when displayed by the separation of two of the shields of a series will remain displayed until some other shaft $a$ is rocked in a direction to separate two other shields of either series, when the first-mentioned target will be concealed and a target of the newly-actuated shaft disclosed.

Referring now to Fig. 9, I will describe a system of circuits wherein the switch-key illustrated may be advantageously employed for code-signaling. The metallic-circuit telephone-line 1 2 is shown extending from ten substations (five bells on each side of the line) to a spring-jack terminal $q$ at the central office, where connection may be made with the line by means of the operator's plug and cord circuit. I have shown only a portion of the cord-circuit associated with the calling-plug $q'$, which is concerned in the operation of the ringing-key. The tip-strand 3 of the cord-circuit includes the contact-spring $k$, adapted to be moved by bar $g$, and its back contact $k^2$, while the ring-strand 4 of the plug-circuit similarly includes the contact-spring $l$, arranged to be moved by bar $g'$, and its back contact $l^2$. The said springs $k\ l$ when moved are adapted to break connection with their back contacts and to engage front contacts $k^3\ l^3$, respectively, which are connected in multiple branches of a conductor 5, leading to the inner contacts $d'\ e'$ of switch-springs $d\ e$ of the five keys I II III IV V, which anvils are connected in parallel from said conductor, the conductor 5, including the armature $r'$ and its normally open contact of a relay $r$, hereinafter to be described. The springs $d\ e$ of switches I to V are connected in multiple from conductors which lead to brushes bearing upon a continuously-rotating commutator C, adapted to supply current of distinctive characteristics to the switches I to V. The commutator C, which is shown developed into a plane, comprises two outer rings $s\ s'$, each ring having a number of commutator-segments $s^4$ and $s^5$, respectively, connected therewith. One ring $s$ is connected through the medium of a brush $s^2$ and conductor 6 with the free pole of a grounded generator G, while the ring $s'$ is connected to earth by way of a brush $s^3$ and conductor 7. Five brushes $t\ t'\ t^2\ t^3\ t^4$, bearing on the commutator, are adapted to pass over the generator-segments $s^4$ as the commutator revolves and are connected by conductors 8 9 10 11 12 with the springs $d\ e$ of keys I to V, respectively. Thus in each revolution of the commutator the brush $t$ would pass over one segment $s^4$ and apply one short impulse of current from generator G to conductor 8, leading to switch I. Similarly, brush $t'$ in one revolution of the commutator would engage two segments $s^4$ and apply two short impulses of current to conductor 9, leading to switch II, &c. The commutator C would in practice be connected with the shaft of generator G, so as to rotate slowly and at a uniform speed. The springs $k'\ l'$, adapted to be moved by bars $g\ g'$, respectively, are connected in multiple branches of a conductor 13, connected with the free pole of a battery B, and the front contact-anvils $k^4\ l^4$ of said springs are connected in multiple from a conductor 14, leading through the winding of relay $r$, armature $r^2$, and its back contact to a brush $s^6$, which in each revolution of the commutator engages one grounded segment $s^5$. Thus when either spring $k'$ or $l'$ is closed upon its front contact and at the instant the brush $s^6$ passes over the grounded segment $s^5$ a path for current from battery B will be completed through relay $r$. The relay $r$ has a third armature $r^3$, which is included, together with its normally open front contact, in a conductor 15, extending from the free pole of a grounded battery B' through the winding of a release-magnet $i$, heretofore referred to, and connected with a brush $s^7$ of the commutator, which is also adapted to engage one grounded segment $s^5$ in each revolution of the commutator after the other brushes have all engaged their segments, and so to complete a circuit for the release-magnet $i$ in case the contacts $r^3\ r^4$ of relay $r$ are closed. The relay $r$ is adapted when energized as just described to complete at its armature $r'$ and front contact the continuity of conductor 5, leading from the switches to the cord-circuit to complete the ringing-circuit, to move the armature $r^2$ into engagement with its front contact $r^3$, which is connected to earth by a conductor 16, and so complete a locking-circuit for the magnet $r$ independent of the commutator, and finally in drawing up its armature $r^3$ to transfer the control of the circuit of the magnet $i$ to the commutator, whereby the apparatus may be restored to normal condition by the energization of release-magnet $i$, when, after the proper signals have been applied, the brush $s^7$ engages the grounded segment $s^5$.

The operation of the system is as follows: Assume that the operator has inserted the answering-plug of the cord-circuit in the answering-jack of the calling-line and has ascertained the particular subscriber of the party-line with whom communication is desired to be the one whose bell is connected from limb 1 of the line and designated as No. III, his code-signal thus being three rings. The operator after inserting the calling-plug $q'$ into the spring-jack $q$ of the party-line rocks the shaft $a$ of the switch-key No. III in a contra-clockwise direction to close contact-spring $e\ e'$. The bar $g$ is by this operation advanced and locked by the armature of magnet $i$ and in its movement severs the connection of spring $k$ with its anvil $k^2$ and forces springs $k\ k'$ into engagement with contacts $k^3\ k^4$, respectively. The closure of spring $k'$ and its front contact $k^4$ unites conductors 13 and 14, and as soon as the brush $s^6$ passes over the grounded segment $s^5$, the commutator rotating in the direction of the arrow, a path for current from battery B is established by way of conductor 13, spring $k'$ and its front contact $k^4$, conductor 14, winding of relay $r$, armature $r^2$, and back contact of said relay, brush $s^6$, segment $s^5$ to earth. This circuit, which is of course but momentary, effects the energization of relay $r$, which draws up all its armatures. The armature $r^2$ in closing upon its front contact $r^5$ completes a locking-circuit 13 14 16 for relay $r$ independent of the commutator. Armature $r'$ completes the continuity of conductor 5, leading from the switch III to the contact $k^3$, which is now in engagement with the spring $k$, connected with the tip of the calling-plug, and armature $r^3$ extends the circuit of conductor 15, including the release-magnet $i$, to the brush $s^7$. Immediately after the brush $s^6$ leaves the segment $s^5$ the brushes $t$ to $t^4$ will start their travel over the generator-segments $s^4$; but the brush $t^2$, which in each revolution of the commutator engages three generator-segments $s^4$, will alone apply current to the line, since the key III, associated therewith, is the only key whose switch-springs are closed. The brush $t^2$ in passing over the said segments applies three short impulses of current to conductor 10, leading to the now-closed switch-contacts $e\ e'$ of key III, which current passes over conductor 5, through the spring $k$ and its front contact $k^3$, closed by bar $g$, tip-strand 3, to the tip of the plug, and thence over limb 1 to earth through the bells of the substations which are connected in grounded branches from said limb. As the commutator continues to revolve and immediately after the brushes $t$ to $t^4$ pass beyond the last generator-segment the brush $s^7$ engages a grounded segment $s^5$ and completes a circuit for the release-magnet $i$, such circuit extending from battery B', through the winding of magnet $i$, contacts $r^3\ r^4$ of relay $r$, brush $s^7$, segment $s^5$, ring $s'$, brush $s^3$, and conductor 7 to earth. The release-magnet $i$ now becomes energized and attracts its armature $i'$, thereby releasing the bar $g$, which in returning to its normal position breaks the connection of springs $k$ $k'$ with their outer contact-anvils $k^3$ $k^4$, respectively, and restores the normal connection of spring $k$ with its back contact $k^2$, thereby restoring the continuity of the cord-circuit. The locking-circuit for the relay $r$ is thus broken at the spring $k'$ and contact $k^4$, and said magnet and its armatures are restored to their normal condition. The bar $g$ in returning to its normal position also releases the shaft $a$ of key III, whereupon contact-spring $e$ is separated from its anvil $e'$. In case the bell of the wanted subscriber is in a branch from the other side of the line the operator would rock the shaft $a$ of the particular switch-key in a clockwise direction, thus moving the bar $g'$ in the same way that bar $g$ was moved, and the desired number of impulses would be applied to the limb 2 of the line in the same manner as above described, the apparatus being restored to its normal condition when the particular number of impulses are applied to the line and as soon as the brush $s^7$ reaches the grounded segment $s^5$. It will thus be seen that to signal any subscriber it is simply necessary to set the required key and that after the proper number of signals has been transmitted over the line the apparatus is all automatically restored to its normal condition.

It will be apparent that my invention is capable of easy modification by those skilled in the art and that various mechanical equivalents may be substituted for the specific mechanism set forth, and I do not desire to be understood as limiting my invention narrowly to the precise forms shown in the drawings; but

I claim—

1. In a switch-key the combination with a supporting-frame, of a plurality of sets of switch-springs mounted thereon, an actuating-lever for each set of springs, a latch-bar $g$ common to all of said actuating-levers, said latch-bar being adapted to be moved in the operation of any of said levers and to hold said lever in its actuated position, parts $g^3$ of said latch-bar adapted in the movement of said bar to be brought into engagement with all of said levers remaining in their normal condition to prevent their movement, and a magnet adapted to control said latch-bar.

2. In a switch-key the combination with the supporting-frame, of a plurality of sets of switch-springs mounted thereon, an actuating-lever for each set of springs, a latch-bar $g$ common to all said actuating-levers and adapted to be moved in the operation of any of said levers, said latch-bar having parts $g^3$ adapted to hold any of said levers in the position to which it has been moved, said parts in the movement of said latch-bar being brought into engagement with the actuating-levers remaining in their normal position to prevent the movement thereof, an additional set of switch-springs arranged to be operated when said latch-bar is moved by any of said actuating-levers, and a magnet adapted to control the return of said latch-bar to its normal position.

3. In a party-line ringing-key, the combination with a supporting-frame, of a plurality of sets of switch-springs mounted thereon, an actuating-lever for each set of springs, a bar $g$ common to all of said actuating-levers and adapted to be moved in the movement of any of said levers, a latch adapted to hold said bar in the position to which it has been moved, parts $g^3$ carried by said bar adapted to engage whichever of said levers has been operated and hold it in its operated position, and a magnet controlling said latch and adapted when energized to release the same to permit the retraction of said bar $g$.

4. A party-line ringing-key comprising a frame, sets of switch-springs supported on said frame, actuating-levers for said sets of switch-springs, a bar adapted to be moved in the movement of any of said levers to hold said lever in the position to which it has been moved, a magnet, means controlled thereby adapted to hold said bar in its actuated position, and means for returning said bar to its normal position when released.

5. In a switch-key the combination with a frame, of a plurality of sets of switch-springs mounted thereon, an actuating-lever for each set of springs, a latch-bar $g$ common to all said actuating-levers, said latch-bar being adapted to be moved in the movement of any of said levers and to hold said lever in the position to which it has been moved, and a magnet adapted to control said latch-bar.

6. The combination with a plurality of switch-keys, adapted for independent operation, of a blocking device adapted to prevent the operation of said keys, a magnet, and means controlled thereby adapted to hold said blocking device in its operative position.

7. A party-line ringing-key comprising a supporting-frame, a series of actuating-shafts mounted vertically to rock in bearings in said frame, a crank-arm carried by each shaft above the supporting-frame, two sets of switch-springs mounted vertically in association with each shaft, one on either side thereof, and arms carried by each shaft adapted to operate said sets of springs independently of each other according to the direction in which said shaft is rocked.

8. A party-line ringing-key comprising a supporting-frame, a series of actuating-shafts mounted to rock in bearings in said frame, a crank-arm carried by each shaft above the supporting-frame, switch-springs for each shaft operated in the movement thereof, a latch-bar carried by the supporting-frame, a cam carried by each shaft in operative relation to said bar, each cam being adapted when its shaft is rocked to move said latch-bar and be held thereby in its actuated position, a magnet, and means controlled thereby for locking said bar in its actuated position, whereby a shaft when actuated is locked in such position until released by said magnet.

9. A party-line ringing-key comprising a supporting-frame, a series of actuating-shafts mounted to rock in bearings in said frame, a crank-arm carried by each shaft above the supporting-frame, switch-springs for each shaft operated in the movement thereof, a latch-bar carried by the supporting-frame common to all of said shafts, a cam carried by each shaft, each cam being adapted when the shaft is rocked to move said latch-bar and be held thereby in its actuated position, a magnet and means controlled thereby for locking said bar in its operative position, said bar when moved by a cam being brought into engagement with the remaining cams to lock the same in their normal positions and prevent actuation of the shafts associated therewith.

10. A party-line ringing-key comprising a supporting-frame, a series of actuating-shafts mounted vertically to rock in bearings in said frame, a horizontally-projecting crank-arm carried by each shaft above the supporting-frame, sets of switch-springs associated with each shaft on either side thereof adapted to be actuated by said shaft according to the direction in which the same is rocked, a toothed latch-bar mounted upon either side of said series of shafts, a cam carried by each shaft adapted to engage a tooth of either bar to move the same, said cam when actuated being held between the teeth of the bar actuated thereby, a magnet and means controlled thereby for locking either bar in its actuated position, and shoulders for said cam, one adjacent to each of said bars, the teeth of the bar which is moved being adapted to engage the shoulders of those cams which remain in their normal positions and prevent actuation of the shafts associated with said cams.

11. A party-line ringing-key comprising a supporting-frame, a series of actuating-shafts mounted vertically to rock in bearings in said frame, a horizontally-projecting crank-arm carried by each shaft above the supporting-frame, two sets of switch-springs associated with each shaft, one on either side thereof, arms carried by each shaft adapted to move said springs according to the direction in which said shaft is rocked, a toothed bar carried on each side of said series of shafts, each bar having a recess at one end thereof, a cam carried by each shaft adapted to engage a tooth of either bar to move the same according to the direction in which the shaft is rocked, and to be held by the teeth of said bar in its actuated position, contact-springs actuated by each bar in its movement, a magnet, an armature therefor, studs carried by said armature associated with such bar, each stud being adapted when its bar is moved to enter the recess in said bar and lock the same in its advanced position, shoulders formed on each side of the cams, one adjacent to each of said bars, pins carried by said cams, either bar being adapted when operated to engage the shoulders and pins of the cams in their normal positions and prevent actuation of the shafts associated therewith.

12. A signal device for party-line ringing-keys comprising a series of shields movably mounted in a guideway underneath the face of the supporting-frame, an arm carried by the actuating-shaft of each key, a wedge controlled by said arm adapted when said actuating-shaft is rocked to separate a pair of shields, a target concealed by the adjoining ends of each two shields and adapted to be displayed when said shields are separated, the face of the supporting-plate having openings through which the targets may be visible, said target being concealed upon the actuation of another key due to the spreading of the shields by the wedge of such key.

13. A signal device for party-line ringing-keys comprising two series of shields movably mounted in a guideway underneath the top plate of the supporting-frame, one series being located upon each side of the actuating-shafts of the keys, targets of distinctive color concealed by the adjoining ends of said shields, the face of the top plate of the supporting-frame having openings above said targets, an arm carried by the actuating-shaft of each key, a double wedge controlled by said arm adapted to separate a pair of adjoining shields of either series according to the direction in which said shaft is rocked, whereby the target associated with said pair of shields is disclosed, and means for concealing said target when another key is actuated.

14. A signal device for a party-line ringing-key comprising two series of shields slidably mounted in a guideway underneath the top plate of the supporting-frame on either side of the actuating-shafts of the keys, the ends of the shields of each series being beveled and adjoining one another, a target of distinctive color concealed by the adjoining ends of each two shields, the top plate of the supporting-frame having openings therein above the respective targets, an arm carried by the actuating-shaft of each key, a double wedge controlled by said arm adapted to separate two shields of either series according to the direction in which the actuating-shaft is rocked, and a centrally-pivoted rocking lever $p$, each end thereof engaging the end of a series of shields, said lever being adapted when two shields of a series are separated to unite the separated shields of the other series.

15. A party-line ringing-key comprising a series of vertical rotatable shafts, individual switch-springs for each shaft operated in the movement thereof, a row of shields associated with said shafts, targets concealed by said shields, and means actuated in the rotation of any shaft adapted to separate said shields to display a target.

16. A switch-key comprising a supporting-frame, an actuating-shaft mounted vertically to rock in bearings in said frame, a set of vertical switch-springs supported by said frame on each side of said shaft, a double rocking lever carried by the shaft adapted to engage either one of said sets of switch-springs without affecting the other set, according to the direction of rotation of the shaft, and a double crank-arm carried by the shaft above the supporting-frame for operating the same.

17. A switch-key comprising a supporting-frame, a row of shafts mounted vertically to rock in bearings in said frame, two rows of switch-springs one on each side of the row of shafts, transverse slots in the sides of the insulating-base of the frame adapted to support said springs parallel to the shafts, each shaft having associated therewith a set of switch-springs of each row, a double rocking lever carried by each shaft adapted to engage one or the other of the switch-springs associated with said shaft, according to the direction of rotation of said shaft, and a double crank-arm carried by each shaft above the supporting-frame for operating said shaft.

In witness whereof I hereunto subscribe my name this 6th day of June, A. D. 1904.

EDWARD B. CRAFT.

Witnesses:
 EDWIN H. SMYTHE,
 E. F. BEAUBIEN.